(12) United States Patent
Yu

(10) Patent No.: US 6,888,885 B2
(45) Date of Patent: May 3, 2005

(54) MODEM DATA CONSTELLATION DESIGN INCLUDING POWER COMPENSATION FOR ANALOG LOSS AND UTILIZATION OF MAXIMUM DYNAMIC RANGE OF CODEC

(75) Inventor: Jinguo Yu, Manalapan, NJ (US)

(73) Assignee: Agere Systems Inc., Allentown, PA (US)

( * ) Notice: Subject to any disclaimer, the term of this patent is extended or adjusted under 35 U.S.C. 154(b) by 235 days.

(21) Appl. No.: 10/284,860

(22) Filed: Oct. 31, 2002

(65) Prior Publication Data

US 2004/0086032 A1 May 6, 2004

(51) Int. Cl.$^7$ .............................. H04B 1/38; H04L 5/16
(52) U.S. Cl. ....................................... 375/222; 375/242
(58) Field of Search ................................ 375/222, 242, 375/295

(56) References Cited

U.S. PATENT DOCUMENTS

| | | | |
|---|---|---|---|
| 4,965,641 A | 10/1990 | Blackwell et al. | 375/7 |
| 5,394,437 A | 2/1995 | Ayanoglu et al. | 375/222 |
| 5,406,583 A | 4/1995 | Dagdeviren | 375/5 |
| 5,528,625 A | 6/1996 | Ayanoglu et al. | 375/222 |
| 6,178,200 B1 | 1/2001 | Okunev et al. | 375/222 |
| 6,266,376 B1 | 7/2001 | Pilozzi et al. | 375/254 |
| 6,421,394 B1 | 7/2002 | Tanrikulu | 375/261 |
| 6,661,847 B1 * | 12/2003 | Davis et al. | 375/242 |

OTHER PUBLICATIONS

"Technical Topics, Digital SW Broadcasting," (Jan. 1998), http://www.anarc.org/naswa/issues/0198/tech0198.html.

"Modemsite.com, How 56k Modems Work (and don't work)," (updated May 1, 1999), http://808hi.com/56k/x2-7.asp.

"Modems expected to get slight speed boost," (Sep. 17, 1998), http://www.cnn.com/TECH/computing/9809/17/fcc.modems/.

N. Weil, "FCC wants to break the 56Kbps modem speed barrier," (Sep. 16, 1998), http://www.infoworld.com/cgi-bin/displayStory.pl?980916.wnfccmodem.htm.

* cited by examiner

Primary Examiner—Stephen Chin
Assistant Examiner—Curtis Odom

(57) ABSTRACT

A method, system, and computer program product is disclosed for determining the optimal power of the downstream data signal transmitted by a digital server and designing a constellation based on this determination. Digital and analog loss is compensated for by calculating the constellation power, taking into consideration the client modem ADC'S dynamic range, the total loss across the network (both digital and analog losses), and the constrained maximum power of the digital network, so that the power of the transmitted signal at the input of the decoder's (client modem's) ADC is less than but as close as possible, and preferably equal to, the ADC'S maximum average power, $P_{ADC}$. The total loss $L_T$ across the entire network is determined from the handshake information exchanged during the modem start-up sequence. Using this information and the known dynamic range of the client modem's ADC, the power of the downstream data signal can be optimized.

15 Claims, 2 Drawing Sheets

US 6,888,885 B2

MODEM DATA CONSTELLATION DESIGN INCLUDING POWER COMPENSATION FOR ANALOG LOSS AND UTILIZATION OF MAXIMUM DYNAMIC RANGE OF CODEC

FIELD OF THE INVENTION

This invention pertains to transceivers and modems. More particularly, the invention pertains to compensating for digital and analog loss in a connection between a client modem and digital server modem.

BACKGROUND OF THE INVENTION

There is an ever-present desire to maximize the speed of communications via networks, and particularly telecommunication networks such as public telephone systems. The Public Switched Telephone Network (PSTN) has been upgraded so that it is now almost completely digital. The only analog portion of the telephone network remaining is the "local loop," the connection between the central office (CO) and the end-user (e.g., a residential telephone subscriber using a telephone set and/or client modem). The analog local loop is the weak link in an otherwise robust system, and it imposes limitations on the speed with which communications can be transmitted over the PSTN, particularly with respect to data transmissions using modems.

Nonetheless, various ways to take advantage of the fact that a large portion of the telecommunications network is digital have been developed. Examples of such developments can be found in U.S. Pat. No. 5,394,437 to Ayanoglu et al., U.S. Pat. No. 5,406,583 to Dagdeviren, and U.S. Pat. No. 5,528,625 to Ayanoglu et al. (each of which are assigned to AT&T/Lucent and all of which are hereby incorporated by reference herein in their entireties).

The International Telecommunication Union Telecommunications Standardization Sector (ITU-T) adopted the V.90/92 standard for the purpose of standardizing Pulse Code Modulation (PCM) type modems, and this standard is utilized today by virtually all modem manufacturers. The V.90/92 standard assumes that one end of the modem session (the ISP/server side) has a digital connection to the phone network and takes advantage of the high speed digital connection.

The V.90/92 standard requires the provision of a probing signal, also known in the art as digital impairment learning or "DIL". One purpose of the DIL is to give the receiving (analog) modem the opportunity to measure digital network impairments, which includes the digital attenuation or "PAD loss", which is the digital loss $L_D$ across the digital portion of the telephone network. The measurement of $L_D$ made by the receiving modem is used by the receiving modem in formulating an appropriate constellation for the transfer of data. The constellation formulated by the receiving modem is transmitted back to the transmitting modem as a CP/CPt sequence as set forth in section 8.5.2 of the V.90 standard, and this constellation is used to set the downstream data signal power. U.S. Pat. No. 6,178,200 to Okunev et al., incorporated herein fully by reference, provides an overview of constellation design and improvements thereof.

Under the V.90/92 standard, in the downstream direction, the server transmitter transmits 8-bit binary numbers (octets) which correspond to a total of 256 (128+ and 128−) $\mu$-law or a-law levels. Each one of the six phases of the constellation tables consists of a subset of the 256 levels. The calculation of average power of the constellation set is defined in section 8.5.2 of the V.90 standard. For any given modem connection, the noise level is fixed and can be measured during the training period prior to the constellation design. The minimum distance of the constellation levels is required to be larger than the fixed noise level. The rule of thumb is that the higher the average power of the constellation set, the higher the data connection speed.

Up until recently, Federal Communication Commission (FCC) rules constrained the maximum power of the encoded analog signal to −12 dBm in the United States (to prevent interference with other electrical devices). FCC rules imply that the power of a signal from the transmitter end to the receiver end must be within −12 dBm measured at any point of the transmitted path. Recently, the rules were changed so that the maximum constrained power for U.S. systems has been increased to −6 dBm, as it already exists in Europe's A-law digital network.

Significant attention has been paid in the prior art to the downstream transmitter path. Modems currently in service interpret the old rules such that the signal measured at the output of the CODEC=s D/A converter is within −12 dBm. Thus, prior art systems can only partially take advantage of the new −6 dBm maximum constrained power by only compensating for the digital loss over the PAD in the CO (Central Office). For example, if the PAD loss is 6 dBm, the constellation will be designed with the average power not larger than −6 dBm. Thus, the average power of the downstream signal measured at the output of the CODEC=s D/A at the CO is less than −12 dBm. If the PAD loss is 0 dBm, the average constellation power will be less than −12 dBm. Even in countries where the digital network is A-law, which implies 0 dBm PAD loss and −6 dBm constrained maximum, the existing modems still use the constellation having a power not larger than −12 dBm. The likely reason for this is to standardize operations so that $\mu$-law and A-law situations are treated in the same way, thereby allowing the same hardware to be used for both systems.

With the changes in the FCC rules, however, there are two factors that are not currently being considered in the constellation design, but which now can be considered and thus result in better constellation design. First, in prior art constellation design, the maximum average power of an analog signal input to the client modem CODEC ADC (A/C converter) is not considered. Every CODEC ADC has a dynamic range ($C_{max}, C_{min}$) for the input signal. The V.90/92 downstream signal has a peak-to-average ratio $R_{P/A}$. The maximum average signal power of the client modem's CODEC ADC, denoted as $P_{ADC}$, is calculated as $C_{max} - R_{P/A}$. As long as the average power level of an analog signal input to the ADC is less than $P_{ADC}$, the larger the average power of an analog signal input to the ADC is, and the better the S/N (signal-to-noise ratio) of the digital signal output from the ADC. When the average power level of an analog signal input to the ADC equal to $P_{ADC}$, the S/N of the digital signal output from the ADC is maximized. Existing client modems today have a $P_{ADC}$ equal to −9 dBm, and some are −6 dBm.

Second, the analog attenuation over the analog line from the CO to the decoder (client modem) are not considered in present existing modems. This analog loss varies from 0 dBm to 30 dBm, depending on the particular local loop being used.

Since the existing art only compensates the digital loss (pad loss) in the downstream constellation design, it fails to take full advantage of the −6 dBm maximum constrained power. For example, assume that the PAD loss is 0 dBm and that the analog loss is −3 dBm while the decoder's maximum average signal power, $P_{ADC}$, is −9 dBm. Existing modems will design a constellation with its power less than −12 dBm at the transmitter end. Once the constellation arrives to the decoder as an analog signal input to the modem's ADC, its average power will be −15 dBm while the decoder's ADC actually can take a −9 dBm signal.

Accordingly, it would be desirable to have a modem data constellation design that includes power compensation for analog loss and utilization of maximum dynamic range of a CODEC, in view of the newly changed FCC rules.

SUMMARY OF THE INVENTION

The present invention is a method, system, and computer program product for determining the optimal power of the downstream data signal transmitted by a digital server and designing a constellation based on this determination. The present invention compensates for the digital loss and analog loss by calculating the constellation power, taking into consideration the client modem ADC's dynamic range, the total loss across the network (both digital and analog losses), and the constrained maximum power of the digital network, so that the power of the transmitted signal at the input of the decoder's (client modem's) ADC is less than but as close as possible, and preferably equal to, the ADC's maximum average power, $P_{ADC}$. The total loss $L_T$ across the entire network is determined from the handshake information exchanged during the modem start-up sequence. Using this information and the known dynamic range of the client modem's ADC, the power of the downstream data signal can be optimized.

DETAILED DESCRIPTION OF THE PREFERRED EMBODIMENTS

Figure 1:
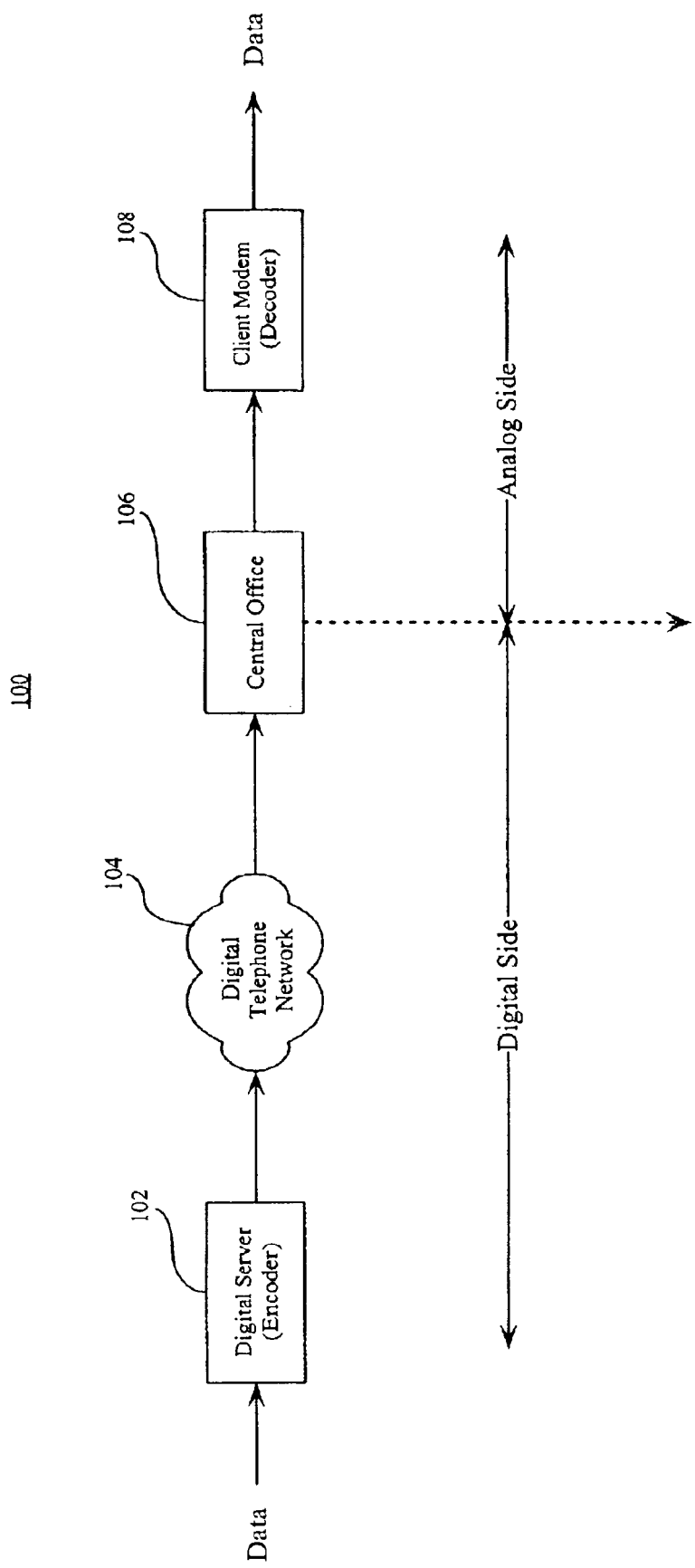
FIG. 1 is an illustration of a typical downstream data path for a typical telecommunication network.

FIG. 1 is an illustration of a typical downstream data path for a typical telecommunication network. Referring to FIG. 1, a digital server 102 encodes input digital user data into a pulse-code-modulated (PCM) data stream so that the message signal can be passed through the voice band channel, and directs this digital signal to the digital telephone network 104 e.g., the PSTN. The signal is then transmitted digitally to the central office 106, and from there the digital signal is converted to a linear value by a µ-law-to-linear or A-law-to-linear converter, which can be implemented as a 256-element lookup table using the standard µ-law-to-linear or A-law-to-linear conversion table. It is then transmitted to the client modem 108. The connection between the central office 106 and the client modem 108 is referred to as the local loop and is the analog portion of the telephone network; the remainder of the telephone network is digital.

Figure 2:
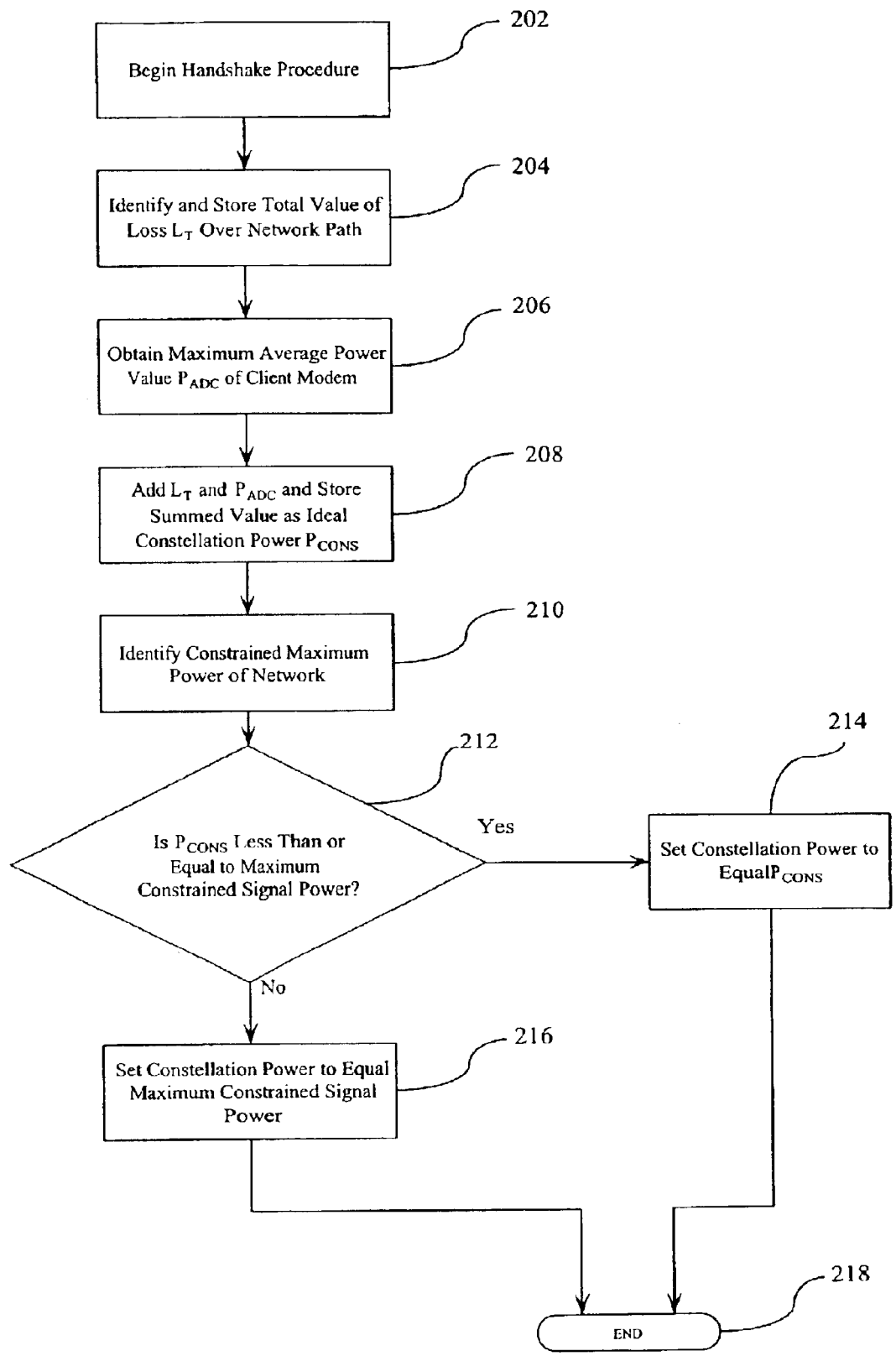
FIG. 2 is a flowchart illustrating an example of steps to be performed in accordance with the present invention.

FIG. 2 is a flowchart illustrating an example of steps to be performed in accordance with the present invention. When client modem 108 begins a communication session over the network, a well-defined "handshake" procedure as set forth in the V.90/92 standard is commenced to establish the connection between the modems involves in the communication session (step 202). Among the elements transmitted during the handshake procedure is the value of the total loss $L_T$ over the network path, and at step 204, this value is identified and stored for use in calculating the ideal constellation power $P_{CONS}$. This $L_T$ value can be stored in any known manner, for example, in a buffer or other temporary storage location available.

In accordance with the present invention, the ideal constellation power $P_{CONS}$ is calculated using the formula $P_{ADC}+L_T$, and if there were no constraint on the maximum power of the encoded signal over the telephone network, $P_{CONS}$ would be used in designing the power of the data constellation. The dynamic range of the analog to digital converter (ADC) of the CODEC in the client modem is known, and thus, so is $P_{ADC}$. At step 206, the maximum average power $P_{ADC}$ of the client modem is obtained (e.g., from vendor information). Thus, calculation of $P_{CONS}$ is easily performed using known programming techniques to add the values of $P_{ADC}$ and $L_T$ (step 208).

As noted above, the maximum power of the encoded signal over the network is constrained; thus, once the ideal $P_{CONS}$ has been calculated, the power of the data constellation transmitted by the digital server can be maximized to be as close to the ideal $P_{CONS}$ as possible but less than the constrained maximum signal power over the telephone network, which is −6 dBm according to the most current FCC rules. Thus, at step 210, the constrained maximum signal power is identified. At step 212, a determination is made as to whether or not $P_{CONS}$ is less than or equal to the maximum constrained signal power. If it is less than or equal to the maximum constrained power, then at step 214, the constellation power is set using known methods to be equal to $P_{CONS}$, and the process ends at step 218. If it is determined at step 212 that $P_{CONS}$ is not less than or equal to the maximum constrained signal power (i.e., that it is greater than the maximum constrained signal power), then at step 216 the constellation power is set to equal the maximum constrained signal power, and the process then ends at step 218.

The following examples illustrate the above-described aspects of the present invention. For each of the examples, it is assumed that the maximum average power $P_{ADC}$ of the CODEC is −10 dBm.

EXAMPLE 1

In this example, during the handshaking procedure, a determination is made that the total loss across the network $L_T$ is 5 dBm. Further, during the DIL sequence, the client modem identifies the digital loss (PAD Loss) ($L_D$) across the network as being 3 dBm. To determine the ideal constellation power $P_{CONS}$, the digital server should transmit a signal having a power such that when the signal traverses the downstream path and arrives at the client modem, the power of the signal is equal to the maximum average power of the ADC, $P_{ADC}$. As stated above, in this example, $P_{ADC}$=−10 dBm. Since $P_{CONS}=P_{ADC}+L_T$, then the constellation power $P_{CONS}$ should be −5 dBm (−10 dBm+5 dBm=−5 dBm). As can be seen, making the constellation power $P_{CONS}$ equal to −5 dBm will compensate for the total loss of the downstream path. Since −5 dBm is 1 dBm higher than the current FCC maximum of −6 dBm, the constellation power should be selected to be −6 dBm so that the transmission power can be as close as possible (within FCC regulations) to the $P_{ADC}$ of the modem. Using the prior art technique, the constellation power $P_{CONS}$ would have been −12 dBm+3 dBm=−9 dBm ($P_{MAX}+L_D=P_{CONS}$). By considering both the digital loss and the analog loss, use of the present invention will result in a constellation design that gives 3 dBm gain in Signal-to-Noise (S/N) ration of the digital signal output from the client modem's ADC. The S/N gain in a received signal means that a higher user data rate or more reliable data transmission can be achieved.

EXAMPLE 2

In this example, assume that $L_T=3$ dBm and $L_D=0$ dBm. Using the method of the present invention, the ideal constrained power $P_{CONS}$ will be $-10$ dBm$+3$ dBm$=-7$ dBm. Since $-7$ dBm is at or below the constrained maximum power allowed by the FCC ($-6$ dBm), the constellation design will use $-7$ dBm as the constellation power. A prior art modem will use $-12$ dBm, meaning that a 5 dBm gain is achieved using the system of the present invention.

Using measurable, calculatable, and known parameters, in accordance with the present invention, the performance of the CODEC in a client modem is maximized, thereby resulting in a maximum downstream data rate using the existing V.90/V.92 standards.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage workstation located within a modem connected to the network. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1–2 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A method for determining a constellation power to be used in a network, comprising the steps of:

identifying a total power loss across the network from a server to a client modem;

identifying a maximum average power of said client modem; and setting the constellation power based on said total power loss across the network and said maximum average power of said client modem.

2. The method of claim 1, wherein said setting step comprises at least the steps of:

identifying a constrained maximum signal power of the network;

adding the total power loss across the network to the maximum average power of said client modem, the sum being the ideal constellation power value; and setting the constellation power to be equal to the ideal constellation power value if an ideal constellation power value is less than or equal to the maximum constrained signal power.

3. The method of claim 2, wherein said setting step further comprises at least the step of:

setting the constellation power to be equal to the maximum constrained signal power if the ideal constellation power is greater than the maximum constrained signal power.

4. The method of claim 1, wherein said total power loss across the network includes analog attenuation.

5. The method of claim 1, wherein said total power loss across the network includes both analog and digital attenuation.

6. A system for determining a constellation power to be used in a network, comprising the steps of:

means for identifying a total power loss across the network from a server to a client modem;

means for identifying a maximum average power of said client modem; and means for setting the constellation power based on said total power loss across the network and said maximum average power of said client modem.

7. The system of claim 6, wherein said setting means comprises:

means for identifying a constrained maximum signal power of the network;

means for adding the total power loss across the network to the maximum average power of said client modem, the sum being an ideal constellation power value; and means for setting the constellation power to be equal to the ideal constellation power value if the ideal constellation power value is less than or equal to the maximum constrained signal power.

8. The system of claim 7, wherein said setting means further comprises:

means for setting the constellation power to be equal to the maximum constrained signal power if the ideal constellation power is greater than the maximum constrained signal power.

9. The system of claim 6, wherein said total power loss across the network includes analog attenuation.

10. The system of claim 6, wherein said total power loss across the network includes both analog and digital attenuation.

11. A computer program product recorded on computer readable medium for determining a constellation power to be used in a network, comprising:

computer readable means for identifying a total power loss across the network from a server to a client modem;

computer readable means for identifying a maximum average power of said client modem; and computer readable means for setting the constellation power based on said total power loss across the network and said maximum average power of said client modem.

12. The computer program product of claim 11, wherein said computer readable means for setting comprises:

computer readable means for identifying a constrained maximum signal power of the network;

computer readable means for adding the total power loss across the network to the maximum average power of said client modem, the sum being an ideal constellation power value; and computer readable means for setting the constellation power to be equal to the ideal constellation power value if the ideal constellation power value is less than or equal to the maximum constrained signal power.

13. The computer program product of claim 12, wherein said computer readable means for setting further comprises:

computer readable means for setting the constellation power to be equal to the maximum constrained signal power if the ideal constellation power is greater than the maximum constrained signal power.

14. The computer program product of claim 11, wherein said total power loss across the network includes analog attenuation.

15. The computer program product of claim 11, wherein said total power loss across the network includes both analog and digital attenuation.

* * * * *